United States Patent
Ferencz et al.

(10) Patent No.: US 9,960,636 B2
(45) Date of Patent: May 1, 2018

(54) POWER SUPPLY SYSTEM AND DIRECT-CURRENT CONVERTER THEREOF

(71) Applicant: ACBEL POLYTECH INC., New Taipei (TW)

(72) Inventors: Andrew Ferencz, New Taipei (TW); Shih-Yuan Wang, New Taipei (TW)

(73) Assignee: ACBEL POLYTECH INC., New Taipei (TW)

(*) Notice: Subject to any disclaimer, the term of this patent is extended or adjusted under 35 U.S.C. 154(b) by 859 days.

(21) Appl. No.: 14/329,296

(22) Filed: Jul. 11, 2014

(65) Prior Publication Data

US 2016/0013684 A1   Jan. 14, 2016

(51) Int. Cl.
| | |
|---|---|
| H02J 1/10 | (2006.01) |
| H02J 9/06 | (2006.01) |
| H02M 7/217 | (2006.01) |
| H02M 3/158 | (2006.01) |
| H02M 1/00 | (2006.01) |

(52) U.S. Cl.
CPC ............ H02J 9/061 (2013.01); H02J 1/10 (2013.01); H02M 7/217 (2013.01); H02M 3/1584 (2013.01); H02M 2001/007 (2013.01)

(58) Field of Classification Search
CPC .................................................. H02M 3/1584
See application file for complete search history.

(56) References Cited

U.S. PATENT DOCUMENTS

| | | | |
|---|---|---|---|
| 9,385,608 B1* | 7/2016 | Chakraborty | H02M 3/1584 |
| 2012/0256659 A1* | 10/2012 | Kiadeh | H02M 3/1584 |
| | | | 327/108 |
| 2014/0159506 A1* | 6/2014 | Kim | H02M 3/1584 |
| | | | 307/126 |
| 2014/0268891 A1* | 9/2014 | Sigamani | H02M 3/285 |
| | | | 363/17 |
| 2015/0349649 A1* | 12/2015 | Zane | H02M 3/33507 |
| | | | 363/21.03 |

OTHER PUBLICATIONS

D. Aggeler et al., "Ultra-fast DC-charge infrastructures for EV-mobility and future smart grids," 2010 IEEE PES Innovative Smart Grid Technologies Conference Europe (ISGT Europe), Gothenburg, 2010, pp. 1-8.*

* cited by examiner

*Primary Examiner* — Daniel Cavallari
(74) *Attorney, Agent, or Firm* — Pai Patent & Trademark Law Firm; Chao-Chang David Pai (57) ABSTRACT

A DC converter includes a non-isolated conversion module and an isolated conversion module. The non-isolated conversion module is implemented based on a redundant structure and has a first power conversion loop, a second power conversion loop, and an energy storage element. The first and second power conversion loops are connected and share the energy storage element. The energy storage element is further connected to an input terminal of the isolated conversion module. The first and second conversion loops of the non-isolated conversion module convert DC power outputted from two battery sets and output the converted power to the isolated conversion module. The isolated conversion module further supplies DC power to a load. Accordingly, power supply systems using the foregoing DC converter can reduce the number of transformer therein and thus size reduction of the power supply system can be achieved.

14 Claims, 8 Drawing Sheets

POWER SUPPLY SYSTEM AND DIRECT-CURRENT CONVERTER THEREOF

BACKGROUND OF THE INVENTION

1. Field of the Invention

The present invention relates to a power supply system and a converter thereof, and more particularly to a direct-current (DC) converter composed of a pre-stage non-isolated conversion module and a post-stage isolated conversion module dedicated to resolve the issue of conventional DC converters being bulky due to use of transformer in each isolated converter in the conventional DC converters.

2. Description of the Related Art

Figure 7:
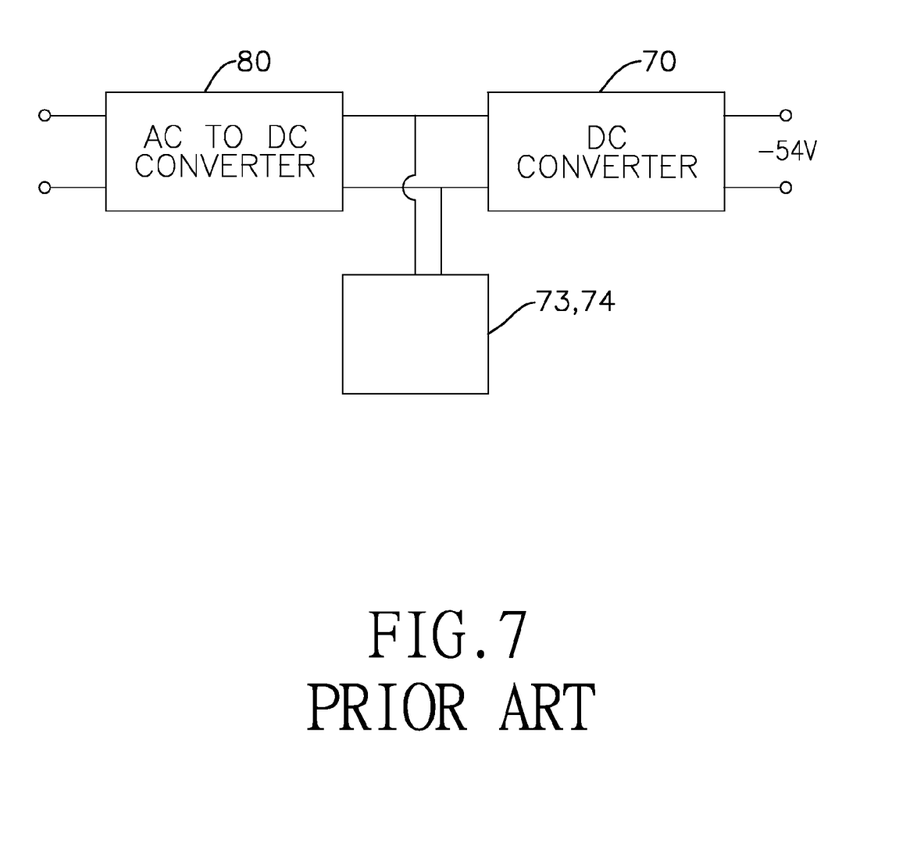
FIG. 7 is a functional block diagram of a conventional power supply system.

With reference to FIG. 7, a conventional power supply system has an AC (Alternating Current) to DC converter 80, a DC converter 70 and two battery sets 73, 74. The AC to DC converter 80 has a set of AC input terminals and a set of DC output terminals. The set of AC input terminals is connected to a mains power. The set of DC output terminals is connected to a set of DC input terminals of the DC converter 70. The two battery sets 73, 74 are bridged over the set of DC input terminals to serve as backup power supplies. When the mains power is irregular, the DC converter 70 converts power of the battery sets 73, 74 into power with a desired voltage to continue supplying the converted power to a load.

Figure 8:
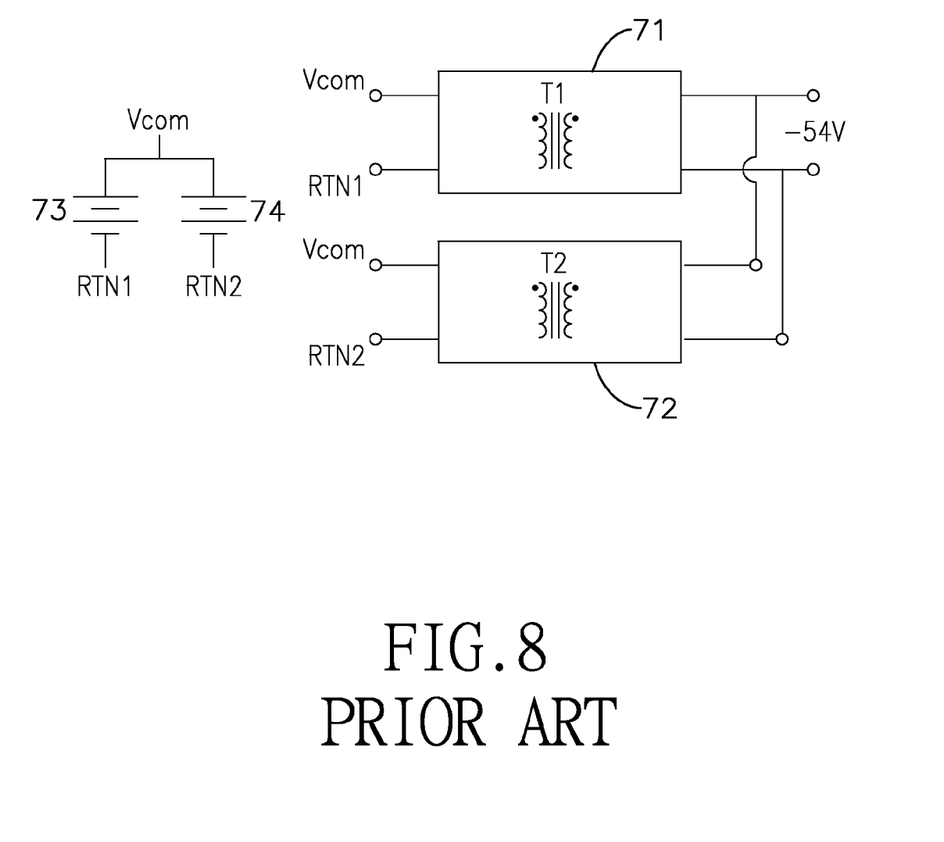
FIG. 8 is a functional block diagram of a DC converter in the conventional power supply system in FIG. 7.

When the foregoing power system is applied to a communication system, the DC converter 70 should be able to output power with negative voltage. With reference to FIG. 8, a DC converter 70 having negative output voltage has a first power conversion module 71, a second power conversion module 72, and two battery sets 73, 74. Each of the first power conversion module 71 and the second power conversion module 72 has a positive input terminal Vcom and a negative input terminal RTN1, RTN2. The positive input terminals Vcom of the first power conversion module 71 and the second power conversion module 72 are connected to a common positive terminal of the battery sets 73, 74. The negative input terminals RTN1, RTN2 are respectively connected to the negative terminals of the battery sets 73, 74. The first power conversion module 71 and the second power conversion module 72 respectively have two sets of output terminals, which are connected in parallel.

The foregoing DC converter employs a redundant structure. When one of the battery sets 73, 74 or one of the first power conversion module 71 and the second power conversion module 72 corresponding to one of the battery sets 73, 74 is faulty, the normal one of the first power conversion module 71 and the second power conversion module 72 can still supply power to the load to achieve the effect of redundant power supply.

Each of the first power conversion module 71 and the second power conversion module 72 of the foregoing DC converter is composed of an isolated converter, and the isolated converter is equipped with at least one transformer. To any communication system or server system, regardless of the system itself or the power supply therefor, how to reduce the size of the system and the power supply has long been a critical subject. However, due to the transformer required in each of the first and second power conversion modules 71, 72, size reduction naturally becomes a challenge to the foregoing DC converter.

SUMMARY OF THE INVENTION

An objective of the present invention is to provide a DC converter composed of a non-isolated conversion module and an isolated conversion module and requiring less number of transformer for reducing the space occupied by the transformers used in multiple isolated converters of conventional DC converters.

To achieve the foregoing objective, the DC converter has a non-isolated conversion module and an isolated conversion module.

The non-isolated conversion module is implemented based on a redundant structure and has a first power conversion loop, a second power conversion loop, and an energy storage element. The first power conversion loop and the second power conversion loop are connected and commonly share the energy storage element.

The isolated conversion module has a set of input terminals and a set of output terminals. The set of input terminals is connected to the energy storage element of the non-isolated conversion module.

The first and second power conversion loops of the non-isolated conversion module in the foregoing DC converter convert DC power outputted from two battery sets and then output the converted DC power to the isolated conversion module. The isolated conversion module further supplies the converted DC power to a load. As the first and second power conversion loops in the non-isolated power conversion module have no transformer therein, the size of the non-isolated conversion module can be significantly reduced. Besides, the post-stage isolated conversion module has only one transformer. Accordingly, the DC converter of the present invention is significantly smaller than conventional DC converters, thereby resolving the issue of the conventional DC converters, which is bulky in size due to the use of multiple transformers therein.

Another objective of the present invention is to provide a power supply system with a reduced size because of less number of transformer used therein.

To achieve the foregoing objective, the power supply system has an AC to DC converter, a DC converter and two battery sets.

The AC to DC converter has a set of AC input terminals and a set of DC output terminals. The set of AC input terminals are adapted to connect to a mains power.

The DC converter has a set of DC input terminals and a set of DC output terminals. The set of DC input terminals are connected to the set of DC output terminals of the AC to DC converter.

The two battery sets are bridged over the set of DC input terminals of the DC converter.

As including the foregoing DC converter, the power supply system has the advantage of reducing the size thereof.

Other objectives, advantages and novel features of the invention will become more apparent from the following detailed description when taken in conjunction with the accompanying drawings.

DETAILED DESCRIPTION OF THE INVENTION

Figure 1:
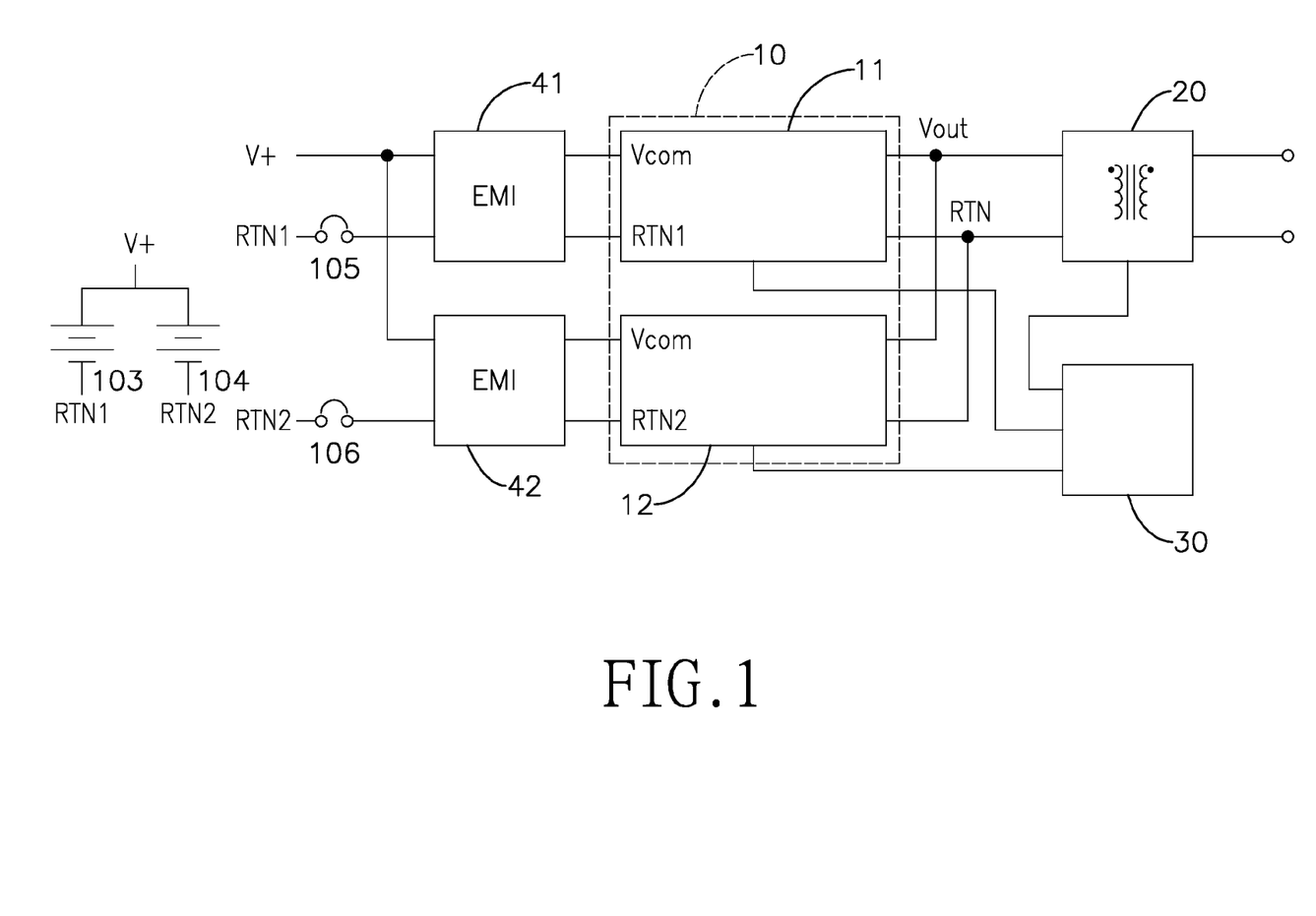
FIG. 1 is a functional block diagram of a DC converter in accordance with the present invention.

With reference to FIG. 1, a DC converter has a non-isolated conversion module 10, an isolated conversion module 20 and a controller 30.

The non-isolated conversion module 10 has a first power conversion loop 11 and a second power conversion loop 12. Each of the first power conversion loop 11 and the second power conversion loop 12 has a positive terminal Vcom and a negative terminal RTN1, RTN2. IN the present embodiment, the DC converter further has a first EMI (Electromagnetic interference) filter 41 and a second EMI filter 42. The positive terminal Vcom and the negative terminal RTN1 of the first power conversion loop 11 is connected to a first battery set 103 through the first EMI filter 41. The positive terminal Vcom and the negative terminal RTN2 of the second power conversion loop 12 is connected to a second battery set 104 through the second EMI filter 42. Positive terminals V+ of the first battery set 103 and the second battery set 104 are commonly connected and further connected to the positive terminals Vcom of the first power conversion loop 11 and the second power conversion loop 12. Negative terminals of the first battery set 103 and the second battery set 104 are respectively connected to the negative terminals RTN1, RTN2 of the first power conversion loop 11 and the second power conversion loop 12.

The controller 30 is connected to the first power conversion loop 11, the second power conversion loop 12, and the isolated conversion module 20 to control power conversion in the non-isolated conversion module 10 and the isolated conversion module 20.

Figure 2:
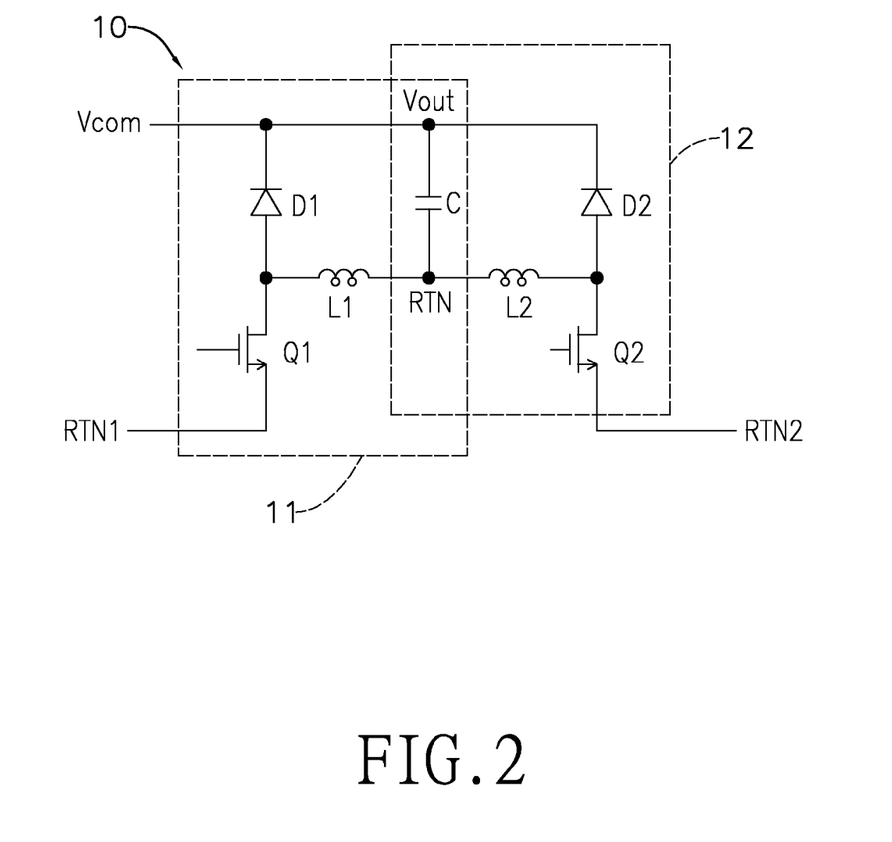
FIG. 2 is a circuit diagram of a first embodiment of a non-isolated conversion module in the DC converter in FIG. 1.

With reference to FIG. 2, a first embodiment of the non-isolated conversion module 10 has a first power conversion loop 11 and a second power conversion loop 12. The first power conversion loop 11 and the second power conversion loop 12 in the present embodiment are buck converters.

The first power conversion loop 11 has a first diode D1, a first switch Q1, a first inductor L1 and an energy storage element. In the present embodiment, the energy storage element is an output capacitor C. The output capacitor C has a first end and a second end. The first end of the output capacitor C and a cathode of the diode D1 are connected to the positive terminal Vcom of the first power conversion loop 11, and the second end of the output capacitor C is connected to one end of the first inductor L1. The other end of the first inductor L1 is connected to the anode of the first diode D1 and the first switch Q1. In the present embodiment, the first switch is a field effect transistor. The drain of the first switch Q1 is connected to the other end of the first inductor L1 and the anode of the first diode D1. The source of the first switch Q1 is connected to the negative terminal RTN1 of the first power conversion loop 11. The gate of the first switch Q1 is connected to and controlled by the controller 30.

The second power conversion loop 12 has a second diode D2, a second switch Q2, a second inductor L2 and an energy storage element. In the present embodiment, the energy storage element shares the output capacitor C in the first power conversion loop 11. The first end of the output capacitor C and the cathode of the second diode D2 are commonly connected to the positive terminal Vcom of the second power conversion loop 12. The second end of the output capacitor C is connected to one end of the second inductor L2. The other end of the second inductor L2 is connected to the anode of the second diode D2 and the second switch Q2. Similar to the first switch Q1 in the first power conversion loop 11, the second switch Q2 is also a field effect transistor. The drain of the second switch Q2 is connected to the other end of the second inductor L2 and the anode of the second diode D2. The source of the second switch Q2 is connected to the negative terminal RTN2 of the second power conversion loop 12. The gate of the second switch Q2 is connected to and controlled by the controller 30.

The first end and the second end of the output capacitor C constitute a positive output terminal Vout and a negative output terminal RTN of the non-isolated conversion module 10, and are connected to a set of input terminals of the isolated conversion module 20.

The controller 30 alternately drives the first power conversion loop 11 and the second power conversion loop 12 of the non-isolated conversion module 10 to convert power of the first battery set 103 and the second battery set 104 into a DC power with a configured voltage to the isolated conversion module 20 for the isolated conversion module 20 to convert the configured voltage of the DC power into another configured voltage and supply the DC power to a load. Operation of the non-isolated conversion module 10 is described in detail as follows.

As to the first power conversion loop 11, when the first switch Q1 is turned on, current flows through the output capacitor C and the first inductor L1, voltage of the output capacitor C rises up, and the first inductor L1 gets charged. When the first switch Q1 is turned off, the first inductor L1 discharges energy to charge the output capacitor C through the first diode D1. On the other hand, when the second switch Q2 of the second power conversion loop 12 is turned on, a current flows through the output capacitor C and the second inductor L2, the voltage of the output capacitor C rises up, and the second inductor L2 is charged. When the second switch Q2 is turned off, the second inductor L2 discharges energy to charge the output capacitor C through the second diode D2. The first power conversion loop 11 and the second power conversion loop 12 are alternately driven to supply DC power to the isolated conversion module 20. DC power outputted from the isolated conversion module 20 may be positive voltage or negative voltage.

Since the first power conversion loop 11 and the second power conversion loop 12 of the non-isolated conversion module 10 have no transformer therein and the post-stage isolated conversion module has only one transformer, the issue of space unduly occupied by transformers can be effectively resolved.

Figure 3:
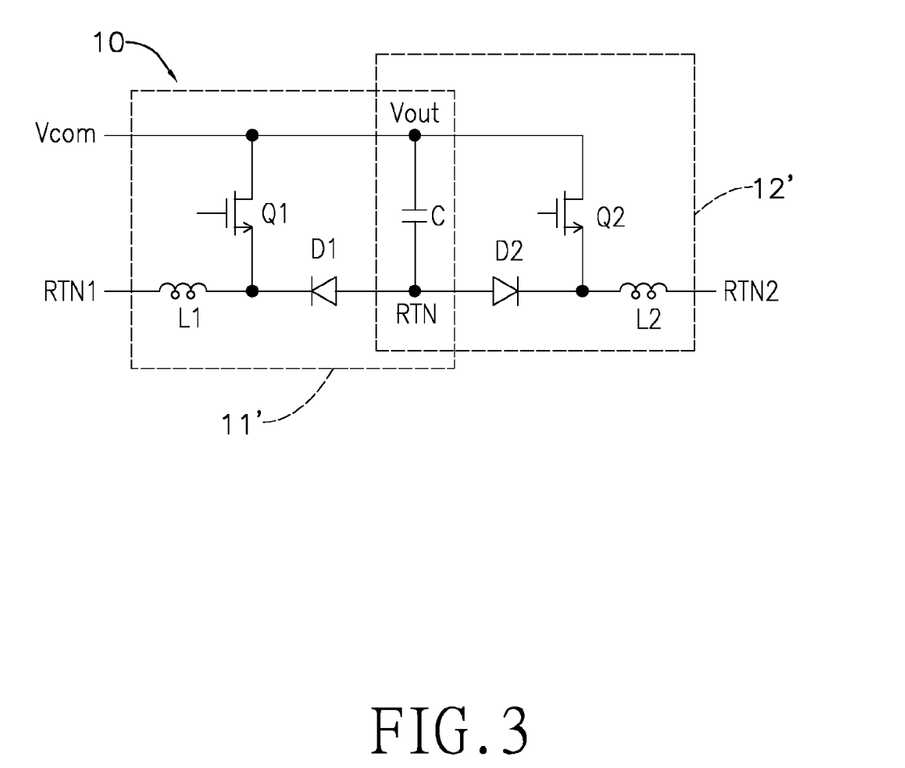
FIG. 3 is a circuit diagram of a second embodiment of a non-isolated conversion module in the DC converter in FIG. 1.

With reference to FIG. 3, a second embodiment of the non-isolated conversion module 10 has a first power conversion loop 11' and a second power conversion loop 12'. The first power conversion loop 11' and the second power conversion loop 12' in the present embodiment are boost converters.

The first power conversion loop 11' has a first diode D1, a first switch Q1, a first inductor L1 and an output capacitor C. The output capacitor C has a first end and a second end. The first end of the output capacitor C and the drain of the first switch Q1 are connected to the positive terminal Vcom of the first power conversion loop 11'. The second end of the output capacitor C is connected to the anode of the first diode D1. The cathode of the first diode D1 is connected to the source of the first switch Q1. The source of the first switch Q1 is connected to one end of the first inductor L1. The other end of the first inductor L1 is connected to the negative terminal RTN1 of the first power conversion loop 11'. The gate of the first switch Q1 is connected to and controlled by the controller 30.

The second power conversion loop 12' has a second diode D2, a second switch Q2, a second inductor L2 and an output capacitor. The second power conversion loop 12' and the first power conversion loop 11' share the same output capacitor C. The first end of the output capacitor C and the drain of the second switch Q2 are connected to the positive terminal Vcom of the first power conversion loop 11'. The second end of the output capacitor C is connected to the anode of the second diode D2. The cathode of the second diode D2 is connected to the source of the second switch Q2. The source of the second switch Q2 is further connected to one end of the second inductor L2. The other end of the second inductor L2 is connected to the negative terminal RTN2 of the second power conversion loop 12'. The gate of the second switch Q2 is connected to and controlled by the controller 30.

The present embodiment differs from the first embodiment in that the first power conversion loop 11' and the second power conversion loop 12' of the non-isolated conversion module 10 boost voltage of power from the first battery set 103 and the second battery set 104 instead of lowering voltage of power from the first battery set 103 and the second battery set 104. The boosted voltage is further converted by the isolated conversion module 20 into DC power with another configured voltage, which may be positive voltage or negative voltage. Detailed operation of the non-isolated conversion module 10 is described as follows.

The operation of the first power conversion loop 11' is depicted first. When the first switch Q1 is turned on, the first inductor L1 is charged. When the first switch Q1 is turned off, the first inductor L1 discharges energy stored therein to charge the output capacitor C, and a current flows through the output capacitor C and the first diode D1.

The operation of the second power conversion loop 12' is depicted as follows. When the second switch Q2 is turned on, the second inductor L2 is charged. When the second switch Q2 is turned off, the second inductor L2 discharges energy stored therein to charge the output capacitor C, and a current flows through the output capacitor C and the second diode D2. The first power conversion loop 11 and the second power conversion loop 12 are alternately driven to supply DC power to the isolated conversion module 20. Similarly, DC power outputted from the isolated conversion module 20 may be positive voltage or negative voltage.

Figure 4:
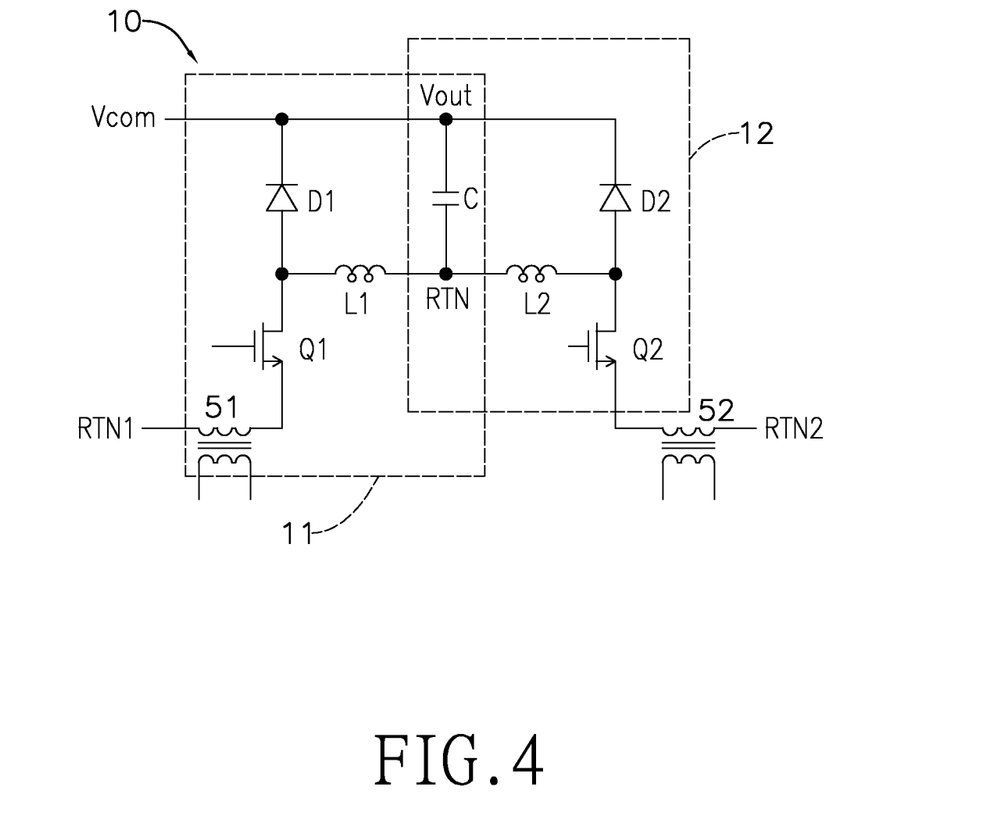
FIG. 4 is a circuit diagram of a third embodiment of a non-isolated conversion module in the DC converter in FIG. 1.

With reference to FIG. 4, a third embodiment of the non-isolated conversion module 10 differs from the first embodiment in two additional current detection elements 51, 52. The two current detection elements 51, 52 are respectively connected with the negative terminals RTN1, RTN2 of the first power conversion loop 11 and the second power conversion loop 12. The current detection elements 51, 52 are further connected to the controller 30 for the controller 30 to sense an input current of the non-isolated conversion module 10. The current detection element 51, 52 may be a hall element, a resistor or a current transformer (CT).

As the positive terminals Vcom of the first power conversion loop 11 and the second power conversion loop 12 are commonly connected, the current detection elements 51, 52 respectively connected to the negative terminals RTN1, RTN2 allow the controller 30 to accurately determine input current to the first power conversion loop 11 and the second power conversion loop 12 and control the first power conversion loop 11 and the second power conversion loop 12 for current sharing thereof. When an output current of the non-isolated conversion module 10 is Iout and output currents of the first power conversion loop 11 and the second power conversion loop 12 are I1, I2 respectively, Iout=I1+I2 and I1=I2. As to current sharing and voltage sharing performed by the controller 30, a master-slave method or an active current sharing method can be adopted. With further reference to FIG. 1, the foregoing design facilitates determination of the specification of two pre-stage no fuse breakers 105, 106. When specification downgrade of the no fuse breaker determined according to the foregoing approaches is permitted, cost down of the present invention is possible.

Figure 5:
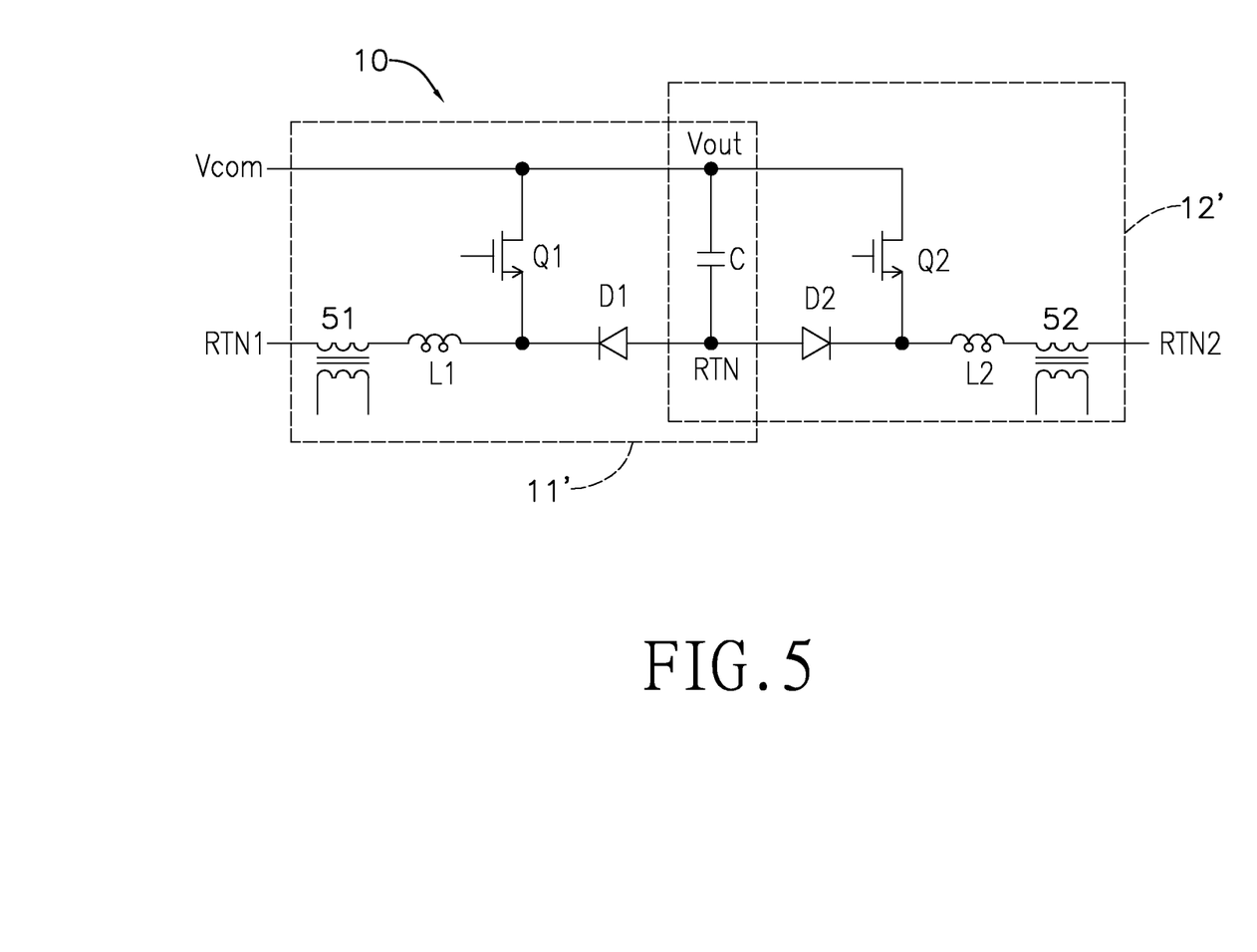
FIG. 5 is a circuit diagram of a fourth embodiment of a non-isolated conversion module in the DC converter in FIG. 1.

Although the first power conversion loop 11 and the second power conversion loop 12 in the present embodiment are buck converters, the current sharing and voltage sharing applicable in the present embodiment is also applicable to boost converters like the first power conversion loop 11' and the second power conversion loop 12' as shown in FIG. 5.

From the foregoing, the DC converter of the present invention is composed of a non-isolated conversion module and an isolated conversion module. As the first power conversion loop and the second power conversion loop in the non-isolated conversion module have no transformer and the post-stage isolated conversion module has only one transformer, the DC converter of the present invention occupies significantly less space relative to conventional DC converters having at least two transformers.

Figure 6:
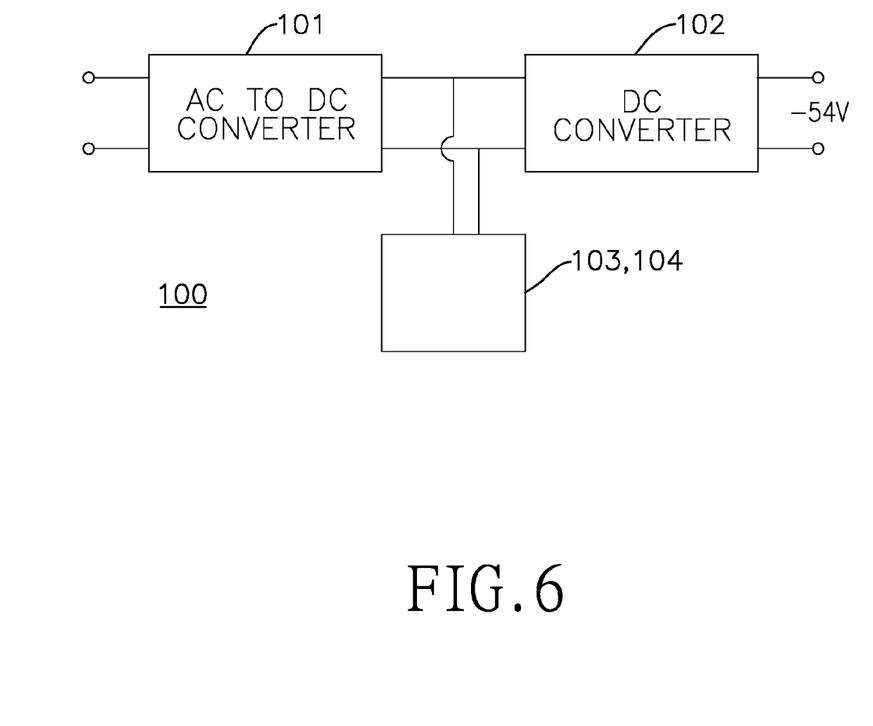
FIG. 6 is a functional block diagram of a power supply system in accordance with the present invention.

With reference to FIG. 6, a power supply system 100 in accordance with the present invention has the foregoing DC converter, and has an AC to DC converter 101, a DC converter 102 and two battery sets.

The AC to DC converter 101 has an AC input terminal and a DC output terminal. The AC input terminal is connected to a mains power.

The DC converter 102 may be one of the DC converters in the foregoing embodiments. The DC converter 102 has a DC input terminal and a DC output terminal. The DC input terminal of the DC converter 102 is composed of the positive terminals and the negative terminals of the first power conversion loop and the second power conversion loop, and is connected to the DC output terminal of the AC to DC converter 101.

The two battery sets are bridged over the DC input terminal of the DC converter 102. Specifically, the battery sets include a first battery set 103 and a second battery set 104. Positive terminals of the first battery set 103 and the second battery set 104 are commonly connected to the positive terminals of the first power conversion loop and the second power conversion loop in the DC converter 102. A negative terminal of the first battery set 103 is connected to the negative terminal of the first power conversion loop in the DC converter 102. A negative terminal of the second battery set 104 is connected to the negative terminal of the second power conversion loop of the DC converter 102.

By adopting the DC converters in the foregoing embodiments, the power supply system reduces the number of transformer in its DC converter design. The size reduction in the DC converters also facilitates the same to be implemented in the power supply system.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A direct current (DC) converter, comprising:
   a non-isolated conversion module implemented based on a redundant structure and having a first buck converter, a second buck converter, and an output capacitor, wherein the first buck converter and the second buck converter are connected and commonly share the output capacitor; and
   an isolated conversion module having:
      a set of input terminals connected to output capacitor of the non-isolated conversion module; and
      a set of output terminals;
   wherein
   each of the first buck converter and the second buck converter of the non-isolated conversion module has a positive terminal and a negative terminal;
   the output capacitor has:
      a first end constituting a positive output terminal of the non-isolated conversion module, and connected to the set of input terminals of the isolated conversion module and the positive terminals of the first buck converter and the second buck converter; and
      a second end constituting a negative output terminal of the non-isolated conversion module, and connected to the set of input terminals of the isolated conversion module;
   the first buck converter has:
      a first diode having:
         an anode; and
         a cathode connected to the positive terminal of the first buck converter;
      a first inductor having two ends, wherein one of the two ends of the first inductor is connected to the second end of the output capacitor and the other end of the first inductor is connected to the anode of the first diode; and
      a first switch being a field effect transistor and having:
         a drain connected to the other end of the first inductor and the anode of the first diode;
         a source connected to the negative terminal of the first buck converter; and
         a gate connected to and controlled by a controller; and
   the second buck converter has:
      a second diode having:
         an anode; and
         a cathode connected to the positive terminal of the second buck converter;
      a second inductor having two ends, wherein one of the two ends of the second inductor is connected to the second end of the output capacitor and the other end of the second inductor is connected to the anode of the second diode; and
      a second switch being a field effect transistor and having:
         a drain connected to the other end of the second inductor and the anode of the second diode;
         a source connected to the negative terminal of the second buck converter; and
         a gate connected to and controlled by the controller.

2. The DC converter as claimed in claim 1, wherein
   each of the first power conversion loop and the second power conversion loop of the non-isolated conversion module is a boost converter and has a positive terminal and a negative terminal;
   the energy storage element is an output capacitor, wherein the output capacitor has:
      a first end constituting a positive output terminal of the non-isolated conversion module, and connected to the set of input terminals of the isolated conversion module and the positive terminals of the first power conversion loop and the second power conversion loop; and
      a second end constituting a negative output terminal of the non-isolated conversion module, and connected to the set of input terminals of the isolated conversion module;
   the first power conversion loop has:
      a first diode having:
         an anode connected to the second end of the output capacitor; and
         a cathode;
      a first inductor having two ends, wherein one of the two ends of the first inductor is connected to the negative terminal of the first power conversion loop; and
      a first switch being a field effect transistor and having:
         a drain connected to the first end of the output capacitor and the positive terminal of the first power conversion loop;
         a source connected to the negative terminal of the first power conversion loop, the cathode of the first diode, and the other end of the first inductor; and
         a gate connected to and controlled by a controller; and
   the second power conversion loop has:
      a second diode having:
         an anode connected to the second end of the output capacitor; and
         a cathode;
      a second inductor having two ends, wherein one of the two ends of the second inductor is connected to the negative terminal of the second power conversion loop; and
      a second switch being a field effect transistor and having:
         a drain connected to the first end of the output capacitor and the positive terminal of the second power conversion loop;
         a source connected to the negative terminal of the second power conversion loop, the cathode of the second diode, and the other end of the second inductor; and
         a gate connected to and controlled by the controller.

3. The DC converter as claimed in claim 1, wherein the non-isolated conversion module further has two current detection elements respectively connected with the negative terminals of the first buck converter and the second buck converter and further connected to the controller.

4. The DC converter as claimed in claim 2, wherein the non-isolated conversion module further has two current detection elements respectively connected with the negative terminals of the first power conversion loop and the second power conversion loop and further connected to the controller.

5. The DC converter as claimed in claim 3, wherein the positive terminal and the negative terminal of the first buck converter are connected to a first electromagnetic interference (EMI) filter, and the positive terminal and the negative terminal of the second buck converter of the non-isolated conversion module are connected to a second EMI filter.

6. The DC converter as claimed in claim 4, wherein the positive terminal and the negative terminal of the first power conversion loop are connected to a first electromagnetic interference (EMI) filter, and the positive terminal and the negative terminal of the second power conversion loop of the non-isolated conversion module are connected to a second EMI filter.

7. The DC converter as claimed in claim 3, wherein each current detection element is a hall element.

8. The DC converter as claimed in claim 4, wherein each current detection element is a hall element.

9. The DC converter as claimed in claim 3, wherein each current detection element is a resistor.

10. The DC converter as claimed in claim 4, wherein each current detection element is a resistor.

11. The DC converter as claimed in claim 3, wherein each current detection element is a current transformer.

12. The DC converter as claimed in claim 4, wherein each current detection element is a current transformer.

13. A power supply system, comprising:
an alternating current (AC) to direct current (DC) converter having:
a set of AC input terminals adapted to connect to a mains power; and
a set of DC output terminals;
the DC converter as claimed in claim 1 and having:
a set of DC input terminals connected to the set of DC output terminals of the AC to DC converter; and
a set of DC output terminals; and
two battery sets bridged over the set of DC input terminals of the DC converter.

14. The power supply system as claimed in claim 13, wherein
the two battery sets include a first battery set and a second battery set, wherein positive terminals of the first battery set and the second battery set are commonly connected and further connected to the positive terminals of the first buck converter and the second buck converter, and negative terminals of the first battery set and the second battery set are respectively connected to the negative terminals of the first buck converter and the second buck converter.

* * * * *